United States Patent Office 3,115,465
Patented Dec. 24, 1963

3,115,465
STABILIZED COMPOSITIONS OF MATTER
Harold D. Orloff, Oak Park, and Gordon G. Knapp, Royal Oak, Mich., assignors to Ethyl Corporation, New York, N.Y., a corporation of Virginia
No Drawing. Filed Apr. 11, 1960, Ser. No. 21,099
27 Claims. (Cl. 252—49.9)

This invention relates to improved organic material and in particular to the use of a synergistic combination of additives to protect organic material from deterioration.

Organic compositions including hydrocarbon fuels, lubricants and polymers are all subject to oxidative deterioration at elevated temperatures or upon prolonged exposure to the elements. In polymeric compositions, including natural rubber and polyethylene, oxidative deterioration causes the loss of desirable characteristics as well as an increase in weight. Hydrocarbon fuel compositions are deteriorated by oxygen during storage to form undesirable components in the fuel.

Industrial and engine lubricants—e.g., mineral oils and synthetic diester oils—undergo oxidative deterioration in service, particularly at elevated temperatures. Resulting from this deterioration are the formation of gums and sludges, the corrosion of metal parts of the equipment with which the oils are used, the loss of lubricating properties of the oil, and the like. Shortcomings of prior antioxidants include low effectiveness except at high concentration, low solubility in the oil, high cost, and difficulty of preparation. Furthermore, most prior art antioxidants possess marginal effectiveness when the oils are subjected to drastic oxidizing conditions, such as are encountered when the oils are held at elevated temperatures, agitated with air, and contain in suspension iron and other metal oxides which catalyze the decomposition of the oil.

A principal object of this invention is to provide compositions of matter protected against oxidative deterioration. A further object is to provide synergistic compositions of additives which are highly effective in inhibiting the oxidative deterioration of hydrocarbon fuels, oils, greases, and polymeric and other organic compositions.

Another object of this invention is to provide lubricants characterized by greatly enhanced resistance to oxidative deterioration, particularly at elevated temperatures. Another object is to provide additives which markedly enhance the resistance of engine and industrial oils against oxidative deterioration, especially under the foregoing drastic conditions. A further object is to provide synergistic combinations of additives which very effectively inhibit the oxidative deterioration of lubricating oil. Still another object is to provide organic polymers, particularly polypropylene, stabilized against oxidative deterioration and discoloration by the presence therein of a small quantity of novel and highly effective antioxidant combinations. A still further object is to provide improved antiknock fluids. Another object is to provide stabilized edible material. Other important objects of this invention will be apparent from the following description.

The above and other objects of this invention are accomplished by providing, as new compositions of matter, organic material tending to deteriorate in the presence of air, oxygen or ozone, protected by an antioxidant quantity of a synergistic mixture consisting of from about 0.005 to about 4—and preferably 0.1 to 1—percent by preferably 0.25 to 2—percent by weight based on the oil soluble phosphite ester having the formula $$\begin{array}{c} R_1O \\ R_2O-P \\ R_3O \end{array}$$

wherein $R_1$ and $R_2$ are alkyl, alkoxyalkyl, haloalkyl, cycloalkyl, halocycloalkyl, aralkyl, aryl, alkary, haloaryl, or haloalkaryl radicals and $R_3$ is hydrogen or one of the aforesaid radicals; and from about 0.01 to about 5—preferably 0.25 to 2—percent by weight based on the oil of a methylenebis phenol having the formula

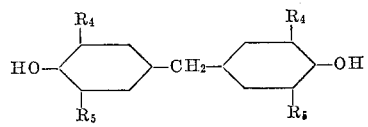

where $R_4$ is an alkyl group containing 3 to 12 carbon atoms, the group being branched on its alpha carbon atom, and $R_5$ is an alkyl group of 1 to 12 carbon atoms.

On the basis of cost-effectiveness, the above-defined phosphorus compounds preferably contain a total of up to about 24 carbon atoms and, when the compounds are halogen substituted, it is preferable that there be no more than 3 halogen atoms in the molecule. These halogens are preferably chlorine or bromine, chlorine being the best, although they can be fluorine or iodine. Especially preferred are dialkyl hydrogen phosphites in which the alkyl groups each contain up to 12 carbon atoms. These compounds give exceedingly large synergistic effects, particularly when combined with 4,4'-methylenebis(2,6-diisopropyl phenol) or 4,4'-methylenebis(6-tert-butyl-o-cresol), these last named combinations being most particularly preferred embodiments of this invention.

The stabilized compositions of this invention possess unexpectedly great resistance against oxidative deterioration, this resistance resulting from the presence therein of the specified combination of additives which co-act synergistically. The magnitude of the synergism is tremendous. For example, it has been found by actual tests that lubricants containing the above synergistic additives have their useful lives prolonged by well over 1800 times.

The phosphites used in this invention are either neutral phosphite esters ($R_3$ of the above formula is not hydrogen) or diesterified hydrogen phosphites ($R_3$ is hydrogen) which are also called phosphonates. Typical of the former are triethyl phosphite, triisobutyl phosphite, tridecyl phosphite, dibutyl hexyl phosphite, tributoxyethyl phosphite, tri-(2-cloroethyl) phosphite, tricyclohexyl phosphite, tri-(4-chlorocyclohexyl) phosphite, tribenzyl phosphite, tri-(4-iodobenzyl) phosphite, tritolyl phosphite, tricumenyl phosphite, dimethyl chlorophenyl phosphite, dibutyl-(4-bromophenyl) phosphite, tri-(2-fluorobutyl) phosphite, etc. Typical of the latter are di-(2-chloroisopropyl) hydrogen phosphite, dicyclohexyl hydrogen phosphite, heptyltolyl hydrogen phosphite, diphenyl hydrogen phosphite, etc. As noted above, dialkyl hydrogen phosphites, such as diisopropyl hydrogen phosphite, di-tert-butyl hydrogen phosphite, dioctyl hydrogen phosphite, and di-(2,6-dimethylheptyl) hydrogen phosphite, where the alkyls each contain up to about 12 carbon atoms, are particularly preferred. When the methylenebis phenol is 4,4'-methylenebis(2,6-di-tert-butyl phenol), best results occur when the alkyl groups of the dialkyl hydrogen phosphite each contain from 4 to 12 carbon atoms. On the other hand, when the especially preferred phenolic compounds 4,4'-methylenebis(2,6-diisopropyl phenol) and 4,4'-methylenebis(6-tert-butyl-o-cresol) are used, the very best results are obtained from dialkyl hydrogen phosphites in which the alkyl groups each contain from 1 to 8 carbon atoms.

The above phosphorus esters are reasonably effective antioxidants under mildly oxidizing conditions. However, their effectiveness falls off sharply at elevated temperatures, especially in the presence of iron oxides. It is thus remarkable that when these materials are combined with the particular bis-phenols described herein, such eminently powerful synergistic effects are achieved even under these drastic conditions.

The preferred phosphite esters for use in the compositions of this invention are the hydrogen phosphites, or phosphonates, as it has been found that an extremely high degree of synergism is obtained by their use.

Examples of the bis-phenols are 4,4'-methylenebis(6-isopropyl-o-cresol; 4,4'-methylenebis(2-propyl - 6 - tert-butyl phenol); 4,4'-methylenebis(2-ethyl - 6 - tert-amyl phenol); 4,4'-methylenebis(2-hexyl - 6 - sec-butyl phenol); 4,4'-methylenebis(6-(1,1,3,3-tetramethylbutyl) - o - cresol); 4,4'-methylenebis(2,6-di-tert-butyl phenol); etc., with 4,4'-methylenebis(2,6-diisopropyl phenol and 4,4'-methylenebis(6-tert-butyl - o - cresol) being especially preferred since they give exceedingly large synergistic effects.

A preferred embodiment of this invention relates to the use of 4,4'-methylenebis(2,6-dialkylphenol) compounds in which the groups represented by $R_4$ in the above formula are tert-alkyl groups containing from 4 to 8 carbon atoms. This preferred embodiment encompasses compounds which are particularly effective in conjunction with the above phosphorus esters or antioxidants for oxygen-sensitive oils, such as lubricating oil, transformer oil, turbine oil, gear oil, greases containing the aforesaid type of oils and the like.

A particularly preferred embodiment of this invention relates to the use of a 4,4'-methylenebis(2-methyl-6-tert-alkyl-phenol). These compounds in conjunction with a phosphite give rise to a superlative antioxidant mixture for a wide variety of oxygen-sensitive organic material, particularly oils and greases of the type described above as well as antiknock fluids, polymers and fatty material.

The phenolic compounds used in this invention are white crystalline solids and are soluble in various organic solvents and in gasolines, diesel fuels, hydrocarbon oils and the like. These compounds are further characterized by being relatively stable, non-hygroscopic, readily crystallizable materials.

The structure of the bis-phenols is very important. The exceedingly valuable synergistic effects of this invention definitely appear to be tied in, in some unexplainable manner, with the configuration, chain length and relative positions of the alkyl groups and the relative positions of the methylene bridge and the hydroxyl groups. This is borne out by tests showing that departures from the above specific structural criteria of the bis-phenols result not only in loss of synergistic effect, but in a very sharp drop in over-all effectiveness even when other phenolic compounds are used with the preferred phosphorus additives. For example, decidedly inferior results have been achieved by combining 4-methyl-2,6-di-tert-butyl phenol with dialkyl hydrogen phosphites. Why this should be the case is a question which presently cannot be answered, especially since 4-methyl-2,6-di-tert-butyl phenol is a standard, commercially used and generally effective antioxidant. Thus, coupled with the complete unexpectedness of the synergistic effects of this invention is the further unexpected contribution of the chemical structure of the bis-phenol ingredient.

The additives of this invention find important utility as antioxidants in a wide variety of oxygen-sensitive materials; thus, liquid and solid products derived from petroleum crude are found to possess greatly increased storage stability by the use of an antioxidant of this invention. For example, gasoline jet fuel, kerosene, fuel oil, turbine oils, insulating oils, motor oils and various waxes have increased oxidative stability when they contain an antioxidant of this invention. Likewise, liquid hydrocarbon fuels which contain organometallic additives such as tetraethyllead and other organometallic compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers both derived from naturally occurring sources and those synthetically prepared. Thus, natural rubbers and synthetic rubbers, including oil extended rubbers and sulfur vulcanized rubbers are greatly benefited by the practice of this invention. Examples of the synthetic rubbers protected by the practice of this invention include such synthetics as polybutadiene, methyl rubber, polybutadiene rubber, butyl rubber, GR-S rubber, GR-N rubber, piperylene rubber and dimethylbutadiene rubber.

The practice of this invention is also useful in protecting paraffin and micro-crystalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example, potato chips, fried fish, donuts, crackers, and various types of pastry such as cakes and cookies. Furthermore, fat fortified animal feeds and fish meals used as animal feeds are greatly benefited by the practice of this invention. Not only are these compositions protected against oxidative deterioration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soy bean oil, rapeseed oil, coconut oil, olive oil, palm oil, corn oil, sesame oil, peanut oil, babassu oil, citrus oils, cotton seed oil and various compositions containing these including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinyl acetate, various epoxide resins and polyester resins and polymers including the alkyds. However, in particular the compositions of this invention are outstanding antioxidants for saturated hydrocarbon synthetic polymers derived from polymerization of an aliphatic monoolefin hydrocarbon compound having preferably up to 5 carbon atoms and only a single unit of unsaturation per monomeric molecule. Examples of such monomers include ethylene, propylene, butylene, isobutylene, 2-methyl-4-butene, 2-methyl-3-butene and the like. Thus, the polymers are homopolymers and copolymers of ethylene, propylene, butylene, isobutylene and the pentenes and are usually solid. Polyethylene and polypropylene are preferred polymers in the practice of this invention and they are derived from the polymerization of ethylene and propylene respectively.

A preferred embodiment of this invention involves providing a lubricating oil normally susceptible to oxidative deterioration containing, in amount sufficient to inhibit such deterioration, a small antioxidant quantity of the above mixture of a 4,4'-methylenebis(2,6-dialkylphenol) and phosphite. It has been found in actual practice that small amounts of these mixtures very effectively stabilize lubricant compositions—e.g. petroleum hydrocarbon oils and synthetic diester oils—against oxidative deterioration.

The unexpected and disproportionately increased antioxidant effects of this invention show up under all normal conditions encountered in the manufacture, shipment, storage and use of lubricants. It is especially significant that the synergism is very pronounced under high-temperature oxidizing conditions since there is a real need for lubricants that are stable under these conditions. Moreover, these synergistic effects are undaunted by the presence in the oil of deleterious oxidation catalyst, such as iron oxide, which at high temperatures normally promote catastrophic deterioration of lubricants.

In formulating the lubricants, the above synergistic additives are blended in appropriate quantity with the oil, the phosphite and the bis-phenol being used either as a preformed blend or mixture, or by adding them separately in either order.

The following examples illustrate various specific embodiments of this invention. Parts and percentages are by weight. The physical characteristics of the illustrative oils used in Examples 1 through 9 are shown in Table I.

TABLE I.—PROPERTIES OF REPRESENTATIVE PETROLEUM HYDROCARBON OILS

| Oil | A | B | C | D | E | F |
| --- | --- | --- | --- | --- | --- | --- |
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, percent | 0.2 | 0.3 | 0.3 | 0.3 | 0.3 | 0.1 |

*Example 1*

To 100,000 parts of Oil A is added with stirring 25 parts (0.025 percent) of trimethyl phosphite. To this oil is then added 100 parts (0.1 percent) of 4,4'-methylenebis(2,6-di-(2-dodecyl)phenol). The resultant oil possesses greatly enhanced resistance to oxidative deterioration.

*Example 2*

To 100,000 parts of Oil B are added 3000 parts (3 percent) of trixylyl phosphite and 200 parts (0.2 percent) of 4,4'-methylenebis(6-isopropyl-o-cresol). After mixing, the resulting oil possesses greatly enhanced oxidation resistance.

*Example 3*

With 100,000 parts of Oil C are blended 500 parts (0.5 percent) of dibutyl hydrogen phosphite and 500 (0.5 percent) of 4,4'-methylenebis(2,6-di-tert-butyl phenol). The resulting oil is found to possess markedly great resistance to oxidative deterioration.

*Example 4*

To 100,000 parts of Oil D are added 1000 parts (1 percent) of dibenzyl hydrogen phosphite and 2000 parts (2 percent) of 4,4'-methylenebis(2-nonyl-6-tert-butyl phenol). After agitation, the homogeneous lubricant possesses great resistance against oxidative deterioration.

*Example 5*

With 100,000 parts of Oil E are blended 80 parts (0.08 percent) of tri-(3-bromooctyl) phosphite and 800 parts (0.8 percent) of 4,4'-methylenebis(2-ethyl-6-(1,1,3,3-tetramethylbutyl)phenol). The resulting lubricant is found to possess great resistance to high-temperature oxidative deterioration.

*Example 6*

To 100,000 parts of Oil F are added 4000 parts (4 percent) of dicumenyl hydrogen phosphite and 3000 parts (3 percent) of 4,4'-methylenebis(6-tert-amyl-o-cresol). After mixing, the resultant oil is greatly resistant to oxidative deterioration.

*Example 7*

With 100,000 parts of Oil A are blended 50 parts (0.05 percent) of tri-(2-ethoxyethyl) phosphite and 500 parts (0.5 percent) of 4,4'-methylenebis(2-isopropyl-6-decyl phenol). Greatly increased is the resistance of this oil against oxidative deterioration.

*Example 8*

To 100,000 parts of Oil B are added 100 parts (0.1 percent) of butyl decyl hydrogen phosphite and 250 parts (0.25 percent) of 4,4'-methylenebis(6-tert-butyl-o-cresol). The mixture is agitated and found to possess extreme resistance against oxidative deterioration.

*Example 9*

To 100,000 parts of Oil C are added 500 parts (0.5 percent) of tri-(4-chlorophenyl) phosphite and 200 parts (0.2 percent) of 4,4'-methylenebis(2,6-di(2-hexyl)phenol). The finished oil is very highly resistant to oxidative deterioration.

In all of the foregoing illustrative examples, the increased resistance to oxidative deterioration results from a very substantial synergistic co-action of the additive combinations, especially when the preferred combinations are used in the preferred concentrations.

*Example 10*

To illustrate the striking benefits of this invention a standard oil oxidation test was used. The equipment and test procedure as described by Kroger et al., Erdol and Kohle, 2, 389 (1949), served as the basis of the following tests. The equipment and procedure were slightly modified in order to make the oxidizing conditions even more strenuous. In this manner, the test lubricants were subjected to exceedingly severe oxidizing conditions in order to conclusively establish the effectiveness of the additives under very adverse conditions. Furthermore, the modifications were found to provide results which correlated extremely well with the test results of other standard procedures, including actual engine tests.

The equipment consists of a reaction cell connected with an open end manometer whereby the total uptake of oxygen by the oil can be obtained by noting the drop in mercury in the manometer. Thus, the test oil sample is placed in the reaction cell which is flushed with oxygen and the temperature raised to 300° F. and held there until the substrate oil undergoes catastrophic oxidation as shown by the rapid uptake of oxygen. In all cases, the substrate oil was deliberately contaminated with iron hexoate as an oxidation promoter (0.05 weight percent of iron as $Fe_2O_3$ per 100 grams of oil). By so doing, a very close simulation of stringent oxidizing conditions prevailing with many uses of lubricants was achieved.

In the following tests, the oxidation stability of the test lubricant was determined by measuring its induction period, that is, the time required for catastrophic deterioration to occur under the foregoing conditions. Hence, the longer the induction time, the more stable was the lubricant.

In one series of tests, the base lubricant was a commercially available, additive-test mineral oil having a viscosity index of 106.5. Tested separately and in combination were 0.13 percent by weight of dimethyl hydrogen phosphite and 0.42 percent by weight of 4,4'-methylenebis(2,6-diisopropyl phenol). The phenomenal synergistic data are shown in Table II.

TABLE II.—EFFECT OF ADDITIVES ON LUBRICATING OIL

| Additive | Induction time, min. | |
|---|---|---|
| | Calculated | Found |
| 4,4'-Methylenebis(2,6-diisopropyl phenol) | | 43 |
| Dimethyl hydrogen phosphite | | 3 |
| 4,4'-Methylenebis(2,6-diisopropyl phenol) +dimethyl hydrogen phosphite | 46 | 1,896 |

When these tests are repeated using di-(butoxyethyl) hydrogen phosphite or ditolyl hydrogen phosphite in place of dimethyl hydrogen phosphite, similar unexpected synergistic effects are noted, although the magnitude is not quite as large.

*Example 11*

In another example, dimethyl hydrogen phosphite (0.12 percent) and 4,4'-methylenebis(6-tert-butyl-o-cresol) (0.42 percent) were tested in the oil separately and in combination. The amazing synergistic data showing an exponentially lengthed induction time are presented in Table III.

TABLE III.—EFFECT OF ADDITIVES ON LUBRICATING OIL

| Additive | Induction time, min. | |
|---|---|---|
| | Calculated | Found |
| 4,4'-Methylenebis(6-tert-butyl-o-cresol) | | 157 |
| Dimethyl hydrogen phosphite | | 3 |
| 4,4'-Methylenebis(6-tert-butyl-o-cresol) +dimethyl hydrogen phosphite | 160 | 2,885 |

Similar synergistic effects are found when the above tests are repeated using tripropyl phosphite, tri-(4-tert-butyl-benzyl) phosphite, and dimethyl phenyl phosphite in place of dimethyl hydrogen phosphite. Other bisphenols described herein also give very good synergistic effects when used in place of 4,4'-methylenebis(6-tert-butyl-o-cresol).

The great importance of the structure of the phenolic compound used in this invention was clearly shown by comparative tests. For example, the combination of 0.16 percent of dimethyl hydrogen phosphite and 0.25 percent of 4-methyl-2,6-di-tert-butyl phenol gave an induction time of only 118 minutes. Obviously, this value is infinitesimally small as compared to the phenomenal results characterizing this invention.

*Example 12*

To still further demonstrate the superlative results of this invention, many standard Polyveriform oxidation stability tests were carried out. References in the literature to this test are Ind. and Eng. Chem., Anal. Ed., 17, 302 (1945), and Anal. Chem. 21, 737 (1949). Tested was an initially additive-free 95 V.I. solvent-refined SAE 10 crankcase oil. The principal test conditions consisted of passing 70 liters of air per hour through the test oil for a total period of 20 hours while keeping the oil at 300° F. The oil was deliberately contaminated with iron hexoate as described above. Measurements made on the used oils showed the extent by which deterioration had occurred, or had been suppressed by an additive complement of this invention. The criteria were the acid number (the lower the acid number, the less the oil had deteriorated) and the percent viscosity increase measured at 100° F., as compared with the viscosity of the new oil (the lower the percent viscosity increase, the more stable was the lubricant).

In one series of Polyveriform tests, the additives tested separately and in combination were 1 percent of 4,4'-methylenebis(2,6-di-tert-butyl phenol) and 0.16 percent of di-sec-butyl hydrogen phosphite. The tremendous synergism is shown by the data in Table IV.

TABLE IV.—EFFECT OF ADDITIVES ON LUBRICATING OIL

| Additive | Acid number | Percent viscosity increase, SUS [1] at 100° F. |
|---|---|---|
| 4,4'-Methylenebis(2,6-di-tert-butyl phenol) | 3.5 | 58 |
| Di-sec-butyl hydrogen phosphite | 2.7 | 33 |
| 4,4'-Methylenebis(2,6-di-tert-butyl phenol) +di-sec-butyl hydrogen phosphite | 0.7 | 9 |

[1] Saybolt Universal seconds.

Besides being virtually unchanged as shown by the exceedingly low acid number and viscosity change, the tested oil of this invention showed absolutely no visual evidences of oxidative deterioration. The tested oil was given a perfect rating, showing that it looked the same as the original oil.

*Example 13*

In another series of Polyveriform tests, the additives were 1 percent of 4,4'-methylenebis(2,6-di-tert-butyl phenol) and 0.21 percent of di(1,3-dimethylbutyl) hydrogen phosphite. The tremendous synergism provided by this mixture is shown by the data in Table V.

TABLE V.—EFFECT OF ADDITIVES ON LUBRICATING OIL

| Additive | Acid number | Percent viscosity increase, SUS [1] at 100° F. |
|---|---|---|
| 4,4'-Methylenebis(2,6-di-tert-butyl phenol) | 3.5 | 58 |
| Di-(1,3-dimethylbutyl) hydrogen phosphite | 4.3 | 56 |
| 4,4'-Methylenebis(2,6-di-tert-butyl phenol) +di-(1,3-di-methylbutyl) hydrogen phosphite | 1.6 | 17 |

[1] Saybolt Universal seconds.

Here again the used oil of this invention was given a perfect visual rating.

*Example 14*

In still another series of tests, the additives were 4,4'-methylenebis(2,6-di-tert-butyl phenol) (1 percent) and di-octyl hydrogen phosphite (0.25 percent). The enormously increased resistance to oxidative deterioration of this lubricant of the invention is shown by the data in Table VI.

TABLE VI.—EFFECT OF ADDITIVES ON LUBRICATING OIL

| Additive | Acid Number | Percent Viscosity increase, SUS at 100° F. |
|---|---|---|
| 4,4'-Methylenebis(2,6-di-tert-butyl phenol) | 3.5 | 58 |
| Dioctyl hydrogen phosphite | 6.4 | 140 |
| 4,4'-Methylenebis(2,6-di-tert-butyl phenol)+ dioctyl hydrogen phosphite | 1.5 | 10 |

As before, the used oil of this invention was given a perfect visual rating.

Repetition of the above Polyveriform tests using other combinations of this invention, such as 4,4'-methylenebis (2 - ethyl - 6 - (1,1,2,2 - tetramethylpropyl)phenol) or 4,4' - methylenebis(2 - propyl - 6 - (2 - dodecyl)phenol)

with tributyl phosphite, methyldiisopropyl phosphite, tricyclopentyl phosphite, dibenzylheptyl phosphite, triphenyl phosphite, methylditolyl phosphite, or 2-chloroisopropyl dixylyl phosphite provides similar synergistic effects.

*Example 15*

The synergistic effects of this invention persist in the presence of other commonly-used oil additives. This was shown by another series of Polyveriform tests in which the base mineral oil always contained 4 percent by weight of a barium sulfonate detergent. The test conditions were as described above with the exception that copper-lead bearings were immersed in the oils throughout the test period, so as to measure the extent by which the bearing metals were corroded during these stringent oxidizing conditions. Tested in this barium sulfonate oil were 0.52 percent of tri-(2-chloroisopropyl) phosphite plus 1 percent of 4,4'-methylenebis(2,6-di-tert-butyl phenol) and 0.26 percent of tri-(2-chloroisopropyl) phosphite plus 1 percent of 4,4'-methylenebis(2,6-di-tert-butyl phenol). A control sample of the barium sulfonate oil contained 0.52 percent of tri-(2-chloroisopropyl) phosphite in the absence of the bis-phenol. The striking results are shown in Table VII.

TABLE VII.—EFFECT OF ADDITIVES ON LUBRICATING OIL

| Additive | Bearing Weight Loss, mg. | Acid Number | Percent Viscosity Increase, SUS at 100°F. |
|---|---|---|---|
| Tri-(2-chloroisopropyl) phosphite (0.52 percent) | 139.8 | 5.7 | 104 |
| Tri-(2-chloroisopropyl) phosphite (0.52 percent)+4,4'-methylenebis(2,6-di-tert-butyl phenol (1 percent) | 21.2 | 0.8 | 7 |
| Tri-(2-chloroisopropyl) phosphite (0.26 percent)+4,4'-methylenebis(2,6-di-tert-butyl phenol) (1 percent) | 37.1 | 1.0 | 8 |

It is seen from the above data that not only are the combinations of this invention markedly synergistic in antioxidant effectiveness, but are surprisingly effective in minimizing bearing corrosion even when the phosphorus compound contains normally corrosive chlorine atoms.

*Example 16*

The benefits of this invention are still further demonstrated by carrying out engine tests, such as the CRC L-38 Test, as described in "Development of Research Technique for Study of the Oxidation Characteristics of Crankcase Oils in the CLR Oil Test Engine," published by the Coordinating Research Council, New York, March 1957. This test very effectively evaluates the oxidation and copper-lead bearing corrosion characteristics of engine crankcase oils. The technique involves operating the CLR Oil Test Engine under constant speed, air/fuel ratio, and fuel-flow conditions for a total of 40 hours, subsequent to a break-in period of 4.5 hours. Prior to each test, the engine is cleaned, pertinent measurements of engine parts are taken and a complete set of new piston rings and new copper-lead connecting-rod test bearing inserts are installed. The chief operating conditions are:

Speed _____ 3150±25 r.p.m.
Fuel-flow _____ 4.5 to 5.0 lb./hr.
Air/fuel ratio _____ 14.0±0.5.
Intake-air temperature _____ 80° F., min.
Jacket-outlet coolant temperature ___ 200°±2° F.
Spark advance _____ 35°±1° B.T.D.C.
Oil pressure _____ 40±2 p.s.i.
Crankcase vacuum _____ 2±0.5 in. water.
Exhaust back pressure _____ 0 to 1 in. mercury.

Performance of the oil is judged by visual examination of the engine for deposits, by the weight loss of the test bearing and by comparison of inspection data on used oil samples with the inspection data on the new oil. When a typical additive-free, lubricating oil, such as any of those described in Table I, is subjected to this test, it is found that there has been a substantial weight loss of the test bearings and a considerable amount of deterioration of the oil. However, repetition of the test with the sole variable being that the oil is treated with an appropriate concentration of mixtures of phosphites and bis-phenols of this invention shows that on completion of the test, there has been a substantial reduction in the weight loss of the test bearings and that the used oil has been virtually unaffected.

The additives of this invention very effectively statilize such lubricating and industrial oils as crankcase lubricating oils, transformer oils, turbine oils, transmission fluids, cutting oils, gear oils, industrial oils, mineral white oils, glass annealing oils, oils thickened with soaps and inorganic thickening agents (grease), and, in general, engine and industrial oils that are normally susceptible to deterioration in the presence of air, particularly at elevated temperatures and most particularly in the presence of iron oxide.

Synergistic effects are exhibited when the above combinations of additives are present in the concentration ranges described above. However, it has been further found that the greatest amount of synergism occurs when the phosphite and the bis-phenol are present in certain relative proportions within the range of the foregoing concentrations. Thus, a particularly preferred embodiment of this invention consists in providing lubricant compositions as described above further characterized in that the phosphite and bis-phenol are present in relative proportions such that there are from about 0.5 to about 5 moles of the phosphite per mole of bis-phenol.

In the lubricant compositions of this invention effective use can be made of other additives which are known to the art, such as other inhibitors, detergent-dispersants, pour point depressants, viscosity index improvers, antifoam agents, rust inhibitors, oiliness of film strength agents, dyes, and the like. Of the inhibitors which can be effectively used with the present additive combinations are sulfurized sperm oil, sulfurized terpenes, sulfurized paraffin wax olefins, aromatic sulfides, alkyl phenol sulfides, lecithin, neutralized dithiophosphates, phosphorus pentasulfide-terpene reaction products, diphenylamine, phenylnaphthylamine, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfides (barium amyl phenyl sulfide, calcium octyl phenol disulfide, etc.), metal salts of wax-substituted phenol derivatives, and the like. Of the viscosity index improvers and pour point depressants, effective use can be made of polymers of the esters of methacrylic acids and higher fatty alcohols and the corresponding polymeric esters of acrylic acid and higher fatty alcohols. Other very useful viscosity index improvers are the polyisobutylenes and polyvinyl ethers. These and other additives which can be employed in the compositions of this invention will now be well known to those skilled in the art.

The additive compositions of this invention are also useful as additives to functional fluids and automatic transmission fluids. The primary constituent of a functional fluid is a refined mineral lubricating oil having carefully selected minimum viscosity of 49 Saybold Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl, or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salts of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis(2-ethylhexyl)sulfosuccinate.

From about 0.03 to about 0.1 percent of a rust preventive such as carboxylic acid derivatives including alkylated succinic acid, esters and partial esters or di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes or a $P_2S_5$-terpene reaction product; organic phosphates and phosphites such as for example, tricresylphosphate or a zinc di-alkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as a polymerized olefin or isoolefin, butylene polymer or alkylated styrene polymer.

The following examples show typical functional fluids of this invention. The fluids are formed by mixing the ingredients together, while heating the oil to a temperature up to 200° F.

*Example 17*

A fluid of this invention is prepared by blending 80 parts of a conventionally-refined Pennsylvania mineral oil (99 SUS at 100° F.), 2 parts of 4,4'-methylenebis-(2,6-di-tert-butylphenol), 0.85 percent phosphorus as diisobutyl hydrogen phosphite, 5 parts of barium petroleum sulfate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

*Example 18*

Another such fluid consists of 95 parts of a solvent-refined, light, acid-treated, clay-contacted, solvent de-waxed paraffin base distillate mineral oil (110 SUS at 100° F.); 0.025 percent phosphorus as dimethyl hydrogen phospite; 0.1 part of 4,4'-methylenebis(2,6-diisopropyl phenol); 0.1 part of calcium octyl phenyl sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

*Example 19*

An automatic transmission fluid is made by mixing 97 percent of an oil blend comprising 59.0 parts of a solvent-extracted, Coastal oil, 40 SUS at 210° F.; 1.0 part of 4,4'-methylene bis(2,6-di - tert - butylphenol); 0.5 part of phosphorus as di-tert-butyl hydrogen phosphate; 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

The synthetic lubricants which are enhanced by the practice of this invention are, in general, non-hydrocarbon organic compositions; i.e. organic compositions which contain elements other than carbon and hydrogen. Examples of general classes of material which are protected against oxidative deterioration by the practice of this invention include diester lubricants, silicones, halogen containing organic compounds including the fluorocarbons polyalkylene glycol lubricants, and organic phosphates which are suitable as hydraulic fluids and lubricants. The synthetic diester oils stabilized by the practice of this invention include sebacates, adipates, etc., which find particular use as aircraft instrument oils, hydraulic and damping fluids, and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable lubricating properties and the inhibitor of this invention very effectively stabilizes these materials against oxidative deterioration. Thus, use can be made of oxalates, malonates, succinates, glutarates, adipates, pimelates, suberates, azelates, sebacates, etc.

The diester lubricants used in the lubricant compositions of this invention have the formula:

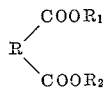

where R is an aliphatic hydrocarbon radical which may be saturated or unsaturated and has from 2 to 14 carbon atoms and $R_1$ and $R_2$ are straight or branched chain alkyl groups. The diesters utilized in the preferred lubricant compositions, include esters of succinic, glutaric, adipic, pimelic, suberic, axelaic and sebacic acid. Typical examples of such esters are diisooctyl azelate, di(2-ethylhexyl) sebacate, di-sec-amyl sebacate, diisooctyl adipate, di(2-ethylhexyl) adipate, di(2-ethylhexyl) azelate, di(1-methyl-4-ethyloctyl) glutarate, diisoamyl adipate, di(2-ethylhexyl) glutarate, di(2-ethylbutyl) adipate, ditetradecyl sebacate and di(2-ethylhexyl)-pinate.

The preferred diesters are generally prepared by esterifying one mole of a dicarboxylic acid having the general formula:

$$HOOC(CH_2)_xCOOH$$

where $x$ is an integer of from 2 to 8, with 2 moles of a branched chain alcohol containing at least 4 carbon atoms. Typical are the reactions of succinic, glutaric, adipic, pimelic, suberic or azelaic acid with sec-amyl alcohol, 3-ethyl butanol, 2-ethyl hexanol or the branched chain secondary alcohols undecanol or tetradecanol.

The preferred diester lubricant fluids have molecular weights ranging from about 300 to about 600 and freezing and pouring points from about $-40°$ to less than about $-100°$ F. Their flash and fire points range from about 300° F. to about 500° F. and their spontaneous ignition temperatures range from about 100° to about 800° F. The diesters made by reacting a dicarboxylic acid with a branched chain alcohol have been found to have superior viscometric properties as compared with diesters made by reacting dihydric alcohols with monocarboxylic acids and thus, diesters prepared by the former method are preferred in formulating the lubricant compositions of this invention.

The diester oils may be formed by the reaction of a polycarboxylic acid with a mono-hydric alcohol, the reaction of a polyhydric alcohol with a mono-carboxylic acid, reaction between a polyhydric alcohol with a polycarboxylic acid, or combinations of the above reactions; for example, reaction of a polycarboxylic acid with a glycol and a mono-hydric alcohol, reaction of a glycol with a polycarboxylic acid and a mono-carboxylic acid, or the reaction of a glycol, a mono-hydric alcohol, a polycarboxylic acid and a mono-carboxylic acid. The acids may be mono-carboxylic aliphatic acids such as, propionic acid, valeric acid, 2-ethyl enanthic acid, 2,2-dipropyl butyric acid or 3-(2-methylhexyl) valeric acid. They may contain unsaturated linkages, such as, in senecioic acid, sorbic acid, or angelic acid; they may be polycarboxylic aliphatic acids such as succinic acid, glutaric acid, axelaic acid, 5-octene-1,8-dicarboxylic acid, or 3-hexene-2,3,4-tricarboxylic acid, and they may be aromatic or cycloaliphatic acids, such as cyclohexaneacetic acid, 1,4-cyclopentylenebis acetic acid, phthalic acid, hemimellitic acid, and terephthalic acid.

The alcohols used in preparing the polyester lubricant base materials may be aliphatic mono-hydric alcohols such as propanol, 2-ethyl-3-hexenol, 2-ethyl-4-propyl heptanol, 2-butenol, or 2-methyl propanol. They may be polyhydric aliphatic alcohols, such as 1,6-hexamethylene glycol, 1,10-decamethylene glycol, 2-hexene-1,6-diol, and 1,6-heptylene glycol, and they may be mono or polyhydric alicyclic or aromatic alcohols, such as 4-[m-(2-hydroxyethyl) phenyl] butanol, 3-(2-hydroxyethyl) cyclohexanebutanol, p-(hydroxymethyl) phenethyl alcohol, α-methyl-p-xylene-α,α'-diol, 1,4-cyclohexane-α,α'-diethyldimethanol, 2,3-bis(4-hydroxybutyl)benzyl alcohol, 4,4'-[3-(3-hydroxyhexyl)-o-phenylene] dibutanol, and 3-[3-(3-hydroxypropyl) cylopenta - 2,4 - dienylene]3-ethyl amyl alcohol.

Afforded by this invention is greatly enhanced oxidation resistance when the present additive combinations are used in such synthetic ester oils as diethyl oxalate; di-sec-butyl malonate; di-(2-hexyl) succinate; di-(isoheptyl) pimelate; di-(3-decyl) suberate; di-sec-amyl glutarate; di-(isobutyl) glutarate; di-(2-ethylbutyl) glutarate; di-(2-ethylhexyl) glutarate; di-sec-amyl adipate; di-(3-methylbutyl) adipate; diethyl adipate; di(4-propylcyclohexyl) adipate; di-2-ethylhexyl adipate; di-sec-amyl azelate; di-(isobutyl) azelate; di(2-ethylbutyl) azelate; di-ethylhexyl) azelate; di-sec-amyl sebacate; di-sec-butyl sebacate; di-(2-ethylhexyl) sebacate; bis - (1 - methyl - 1 - cyclohexyl) sebacate; the glutarates, adipates, azelates and sebacates of branched chain secondary alcohols, such as undecanol, tetradecanol, etc., the butyl, hexyl, heptyl, octyl, nonyl, decyl, undecyl, and dodecyl esters of polyols, such as pentaerythritol, trimethylol propane, trimethylol ethane, etc. and, in general, esters of the type described in the literature as useful for synthetic lubricant purposes.

Another class of synthetic lubricants which achieve enhanced oxidative stability by the practice of this invention includes the "silicone" lubricants. The term "silicone" as used in the specification and claims of this application is defined as a synthetic compound containing silicon and organic groups. In naming specific compounds, the nomenclature system recommended by the American Chemical Society Committee on Nomenclature, Spelling, and Pronunciation (Chem. Eng. News, 24, 1233 (1946)) will be used. Thus, the compounds which have the —Si—O—Si— linkages are the siloxanes. Derivatives of silane, $SiH_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further included are silicate ester oils, such as tetraalkyloxy and tetraaryloxy silanes of the tetra-2-ethylhexyl and tetra-p-tert-butylphenyl types, and the silanes. Also included are the halogen substituted siloxanes, such as the chlorophenyl polysiloxanes.

The polyalkyl, polyaryl, and polyalkyl polyaryl siloxanes are the preferred types of bas medium for the silicon-containing lubricant compositions of the invention because of their high oxidative stability over a wide temperature range. The polyalkyl siloxanes, such as the dimethyl polysiloxane, are slightly preferred over the polyaryl, and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalenes, chlorodiphenyl oxides and chlorinated paraffin waxes.

The fluorocarbon lubricants which are enhanced by this invention are linear polymers built up of a recurring unit which is

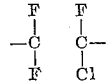

The fluorocarbon oils and greases are very stable chemically and have high thermal stability. These desirable physical properties appear to be closely related to the bond distances occurring in the fluorocarbon polymeric molecule, which may also contain chlorine bonded to carbon.

Polyalkylene glycol lubricants which are benefited by the practice of this invention are ordinarily the reaction product of an aliphatic alcohol with an alkylene oxide. The preferred alkylene oxides are ethylene oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low pour points and they have the general formula:

$$R\text{---}(\text{---}O\text{---}C_nH_{2n})_xOH$$

where $n$ is a small integer and depends upon the alkylene oxide employed and $x$ is a large integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula:

$$R''O\text{---}\underset{\underset{OR'}{|}}{\overset{\overset{O}{\|}}{P}}\text{---}OR$$

where R, R' and R" represent either hydrogen or an organic radical and where at least one of the groups represented by R, R' and R" is an organic radical. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include: tris(2-chloro-1-methylethyl) phosphate; tri-n-butyl-phosphate; tris(2-ethylhexyl) phosphate; triphenyl phosphate; tris(p-chlorophenyl) phosphate; diethyl-m-tolyl phosphate; p-chlorophenyl dimethyl phosphate; tris(2-n-butoxyethyl) phosphate; dimethyl-m-tolyl phosphate; di-n-propyl-m-tolyl phosphate; di-n-butyl phenyl phosphate; 1,3-butylene β-chloroisopropyl phosphate; methyl-di-m-tolyl phosphate; bis(2-chloro-1-methylethyl) m-tolyl phosphate; dimethyl 3,5-xylyl phosphate; 4-chloro-m-tolyl dimethyl phosphate; 2-ethyl-1-n-propyltrimethylene methyl phosphate; 4-chloro-m-tolyl 1-methyltrimethylene phosphate; dimethyl n-octyl phosphate, and the like.

The synthetic base greases used in formulating lubricant compositions of the invention are formed by admixing a soap with an oil of any of the types described above. Such soaps are derived from animal or vegetable fats or fatty acids, wool grease; rosin, or petroleum acids. Typical examples are lead oleate, lithium stearate, aluminum tristearate, calcium glycerides, sodium oleate and the like. In addition, the polyester greases may contain unreacted fat, fatty acids, and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with the polyester oils are preferred as they have superior oxidative stability as compared with greases formulated with other soaps, such as the sodium calcium or lead soaps.

In preparing the improved lubricant compositions of this invention, an appropriate quantity of phenol and phosphorus ester are blended with the diester oil to be stabilized. If desired, preformed concentrated solutions of the stabilizer in the base lubricant can be prepared and then subsequently diluted with additional lubricant to the desired concentration. An advantage of this invention is the fact that the additives are easily and rapidly blended with the base oil. An additional advantage of this invention is that the additives are compatible with the usual additives that are frequently used to fortify lubricant compositions, such as detergent-dispersants, viscosity index improvers, dyes, anti-rust additives, anti-foaming agents and the like.

The following examples illustrate various specific embodiments of this invention.

*Example 20*

To 100,000 parts of a commercially-available pentaerythritol ester having a viscosity at 100° F. of 22.4 centistokes and known in the trade as Hercoflex 600 are added 300 parts (0.3 percent) of dimethyl tolyl phosphite and 400 parts (0.4 percent) of 4,4'-methylenebis(2-isopropyl-6-tert-butyl phenol). The resultant finished oil possesses markedly improved resistance against oxidative deterioration.

*Example 21*

With 100,000 parts of di-(sec-amyl) sebacate having a viscosity at 210° F. of 33.8 SUS, a viscosity index of 133 and a molecular weight of 343.5 are blended 700 parts (0.7 percent) of di-(2-ethylhexyl) hydrogen phosphite and 1000 parts (1 percent) of 4,4'-methylenebis(2,6-diisopropyl phenol). The resistance to oxidative deterioration of the resultant oil is very sharply increased.

*Example 22*

To 100,000 parts of di-(2-ethylhexyl) sebacate having a viscosity at 210° F. of 37.3 SUS, a viscosity index of 152 and a molecular weight of 426.7 are added 1500 parts (1.5 percent) of trioctyl phosphite and 1500 parts (1.5 percent) of 4,4'-methylenebis(2-decyl-6-isopropyl phenol). Next is added 1000 parts (1 percent) of 4,4'-methylenebis(2,6-diisopropyl phenol). The resultant lubricant has very great resistance against oxidative deterioration.

*Example 23*

To 100,000 parts of di-(2-ethylhexyl) adipate having a viscosity at 210° F. of 34.2 SUS, a viscosity index of 121 and a molecular weight of 370.6 are added 30 parts (0.03 percent) of triphenethyl phosphite and 3000 parts (3 percent) of 4,4'-methylenebis(2-octyl-6-(3-heptyl)phenol). After mixing, the resultant diester lubricant is very resistant to oxidative deterioration.

*Example 24*

With 100,000 parts of di-(sec-amyl) sebacate having a viscosity at 210° F. of 33.8 SUS, a viscosity index of 133 and a molecular weight of 342.5 are blended 1000 parts (1 percent) of tri(2,4-dimethylcyclohexyl) phosphite and 250 parts (0.25 percent) of 4,4'-methylenebis(2,6-diisopropyl phenol). The mixture is agitated and the resultant homogeneous lubricant has exceedingly high resistance to oxidative deterioration.

*Example 25*

To 100,000 parts of dioctyl sebacate having a viscosity at 210° F. of 36.7 SUS, a viscosity index of 159 and a molecular weight of 426.7 are added 200 parts (0.2 percent) of di-(2-iodopropyl) hydrogen phosphite and 1500 parts (1.5 percent) of 4,4'-methylenebis(6-tert-butyl-o-cresol). The mixture is agitated to insure homogeneity. The finished oil is very highly resistant to oxidative deterioration.

*Example 26*

With 100,000 parts of the lauryl ester of trimethylol propane are added 2500 parts (2.5 percent) of tri-(chloromethylcyclopentyl) phosphite and 800 parts (0.8 percent) of 4,4'-methylenebis(2,6-di-tert-butyl phenol). The resultant lubricant is very resistant to oxidative deterioration.

Example 27

Thirty parts of 4,4'-methylenebis(2,6-di-tert-amyl phenol) and 50 parts of phosphorus as dimethyl hydrogen phosphite are mixed with 10,000 parts of a grease comprising 11 percent of lithium stearate, 1 percent of polybutene (12,000 molecular weight), 1 percent of sorbitan monooleate, 86.6 percent of di[1-(2-methylpropyl)-4-ethyloctyl] sebacate.

Example 28

One part of 4,4'-methylenebis(2-methyl-6-tert-butyl phenol) and 0.5 part of phosphorus as methyl ethyl hydrogen phosphite are blended with 100 parts of a polymethylpolyphenyl siloxane grease of medium weight consistency having a penetration of 240–280 (ASTM 217–48), a minimum melting point of 400° F. and a serviceable temperature range of from −30 to 400° F. (This siloxane grease is sold under the trade name "Dow-Corning 44.")

Example 29

To a siloxane fluid having a viscosity of 71 centistokes at 25° C. and 24 centistokes at 75° C., a specific gravity of 1.03 at 25° C., a freezing point of −70° C. and a flash point of 540° F., which is composed of a halogen substituted polyphenylpolymethyl siloxane is added sufficient 4,4'-methylenebis(2,6-di-tert-butyl phenol) to give a composition containing 1.5 percent of this additive and sufficient diethyl hydrogen phosphite to give a composition containing 0.65 percent phosphorus. This oil has an extremely high degree of resistance against oxidative deterioration due to the presence of the additive, of this invention.

Example 30

To a poly(trifluorochloroethylene) having the formula $(CF_2CFCl)_x$ and an average molecular weight of 880, pour point of 5° C. and a viscosity of 45 centistokes at 160° F. is added 1.25 percent of 4,4'-methylenebis(2-methyl-6-tert-butyl phenol), and sufficient dimethyl hydrogen phosphite to give one percent phosphorus to prepare an improved lubricant of this invention.

Example 31

A composition consisting of 0.6 percent 4,4'-methylenebis(2,6-di-tert-amyl phenol) and 0.3 percent phosphorus as didecyl hydrogen phosphite is prepared by blending an appropriate quantity of these compounds with a fluorocarbon grease having a penetration of 267 millimeters at 77° F., 285 millimeters at 100° F. and 300 millimeters at 125° F. (ASTM–217–48); and a dropping point of at least 400° F. (ASTM–D–566–42). This grease is commercially available under the trade name "Fluorolube GR-544."

Example 32

To a polyalkylene glycol oil lubricant having a viscosity index of 148, ASTM pour point of −55° F., a flash point of 300° F., a specific gravity of 0.979 and a Saybolt viscosity of 135 at 100° F. is added one percent of 4,4-methylenebis(2-methyl-6-isopropyl phenol) and 0.5 weight percent phosphorus as diisopropyl hydrogen phosphite, to prepare and extremely oxidation resistant polyalkylene glycol lubricant.

Example 33

An improved lubricant of this invention comprising a chlorinated organic compound is prepared by admixing 0.5 percent of 4,4-methylenebis(2-ethyl-6-tert-octyl phenol), and 0.25 weight percent phosphorus as dimethyl hydrogen phosphite with a chlorodiphenyl oil having a distillation range of from 554 to 617° F., a Saybolt viscosity at 100° F. of about 49, a pour point of −30° F. and a specific gravity of about 1.267.

Example 34

An improved hydraulic fluid and lubricant according to this invention is prepared by adding 2 percent of 4,4-methylenebis(2-tert-octyl - 6 - tert - butyl phenol) and one percent phosphorus as dimethyl phosphonate to tricresyl phosphate.

As noted above, the compounds of this invention are also excellent antioxidants for saturated hydrocarbon polymers.

Polyethylene and polypropylene are, for example, hydrocarbon polymers derived from the polymerization of ethylene and propylene. This polymerization can be accomplished by a great variety of methods which lead to products of diverse properties. Polymers of any nature may advantageously be utilized for preparing compositions according to the present invention. The polymers which are employed may, for example, be similar to those which may be obtained by polymerizing ethylene in a basic aqueous medium and in the presence of polymerization favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of groups IVB, VB and VIB metals of the periodic system; chromium oxide on silicated alumina; hexavalent molybdenum compounds; and charcoal supported nickel-cobalt. The polymer which results from these various polymerization processes may have a molecular weight in the range from 1300 to over 1,000,000 depending on the particular conditions of polymerization employed.

Example 35

The benefits derived from the practice of this invention are demonstrated by comparative oxidation tests of uninhibited polyethylene and polyethylene containing an antioxidant of this invention. These tests are conducted as follows: The selected amount of antioxidant is blended with the polyethylene by milling a weighed quantity of plastic pellets on a warm roll-mill. The weighed quantity of antioxidant is added to the mill after the polyethylene has been premilled for a short period of time. The plastic containing the antioxidant is then added in weighed quantity to a standard size vessel and melted to give a surface of reproducible size. The vessel is then inserted into a chamber which may be sealed and which is connected to a capillary tube leading to a gas buret and leveling bulb. The apparatus is flushed with oxygen at room temperature, sealed, and the temperature is raised to 150° F. The oxygen pressure is maintained at 1 atmosphere by means of the leveling bulb. The oxygen uptake at the elevated temperature is recorded for the duration of the test. This procedure has been adopted since it has been found that many compounds may inhibit the oxidation for a certain induction period after which time a very sharp increase in the rate of oxygen uptake occurs indicating that the antioxidant has been exhausted. In tests of this nature 0.05 percent 4,4'-methylenebis(2,6-diisopropyl phenol) was added to one sample of the polyethylene. Another sample of the polyethylene was tested uninhibited. A third sample contained 0.05 percent 4,4'-methylenebis(2,6-diisopropyl phenol) and 0.0425 percent bis(2-ethylhexyl) phosphonate. The induction period of the sample containing the 4,4'-methylenebis(2,6-diisopropyl phenol) was 32 hours, whereas the uninhibited sample had no induction period and took up oxygen immediately. After 20 hours of heating the uninhibited sample had absorbed over 45 ml. of oxygen.

The outstanding results obtainable with the antioxidant compositions of this invention in contrast to those obtained with the uninhibited polyethylene or phenol alone are demonstrated by the test which was conducted with the composition of this invention. When 0.05 percent 4,4'-methylenebis(2,6-diisopropyl phenol) and 0.0425 percent bis(2-ethylhexyl) phosphonate was compounded with the polyethylene, the induction period did not expire until 45 hours of heating at 150° C. That is to say the sample of polyethylene had absorbed essentially no oxygen until after 45 hours of heating. Thus, the compositions of this invention are outstandingly superior antioxidants for saturated hydrocarbon polymers.

There are several methods available for preparing the inhibited hydrocarbon polymer compositions of this invention. Thus the blending of the additives of this invention, with a polymer such as, for example, polyethylene, may be carried out on open rolls, on internal mixers or may be accomplished by mixing with extrusion. It is also possible to prepare concentrated batches of the polymer containing excessive amounts of the additive and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The additive may be initially mixed with the polymer in the dried state or may be first dissolved in a suitable solvent, then sprayed on the polymer and milled in.

Examples of the hydrocarbon polymer compositions of this invention prepared as described above follow. All parts and percentages are by weight in these examples.

*Example 36*

To 1,000 parts of polyethylene produced by oxygen catalyzed reaction under a pressure of 20,000 atmospheres and having an average molecular weight of 40,000 is added and mixed 2 parts of 4,4'-methylenebis(2,6-diisopropyl phenol). The resulting composition has a greatly increased oxidative stability.

*Example 37*

To 100 parts of polyisobutylene having an average molecular weight of 100,000 is added 0.5 part of 4,4'-methylenebis(2-methyl-6-tert-butyl phenol) and 0.09 percent phosphorus as diisobutyl hydrogen phosphite. The oxidative stability of the polymer is greatly increased by the addition of this compound.

*Example 38*

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 4,4'-methylenebis(2-isopropyl-6-tert-butyl phenol) and 3 percent dimethyl hydrogen phosphite. Polyethylene of improved oxidative stability results.

*Example 39*

A linear polyethylene having a high degree of crystallinity (up to 93 percent) and below 1 ethyl branched chain per 100 carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.05 percent of 4,4'-methylenebis(2,6-di-tert-butyl phenol) and 0.1 percent phosphorus as diethyl hydrogen phosphite and the resulting product has improved stability characteristics.

*Example 40*

To a polyethylene having an average molecular weight of 1500, a melting point of 88–90° C. and a specific gravity of 0.92 is added 1 percent of 4,4'-methylenebis[2-isopropyl-6-(1,1,3,3-tetramethylbutyl) phenol] and 2 percent di-tert-butyl hydrogen phosphite. After milling in the antioxidant an extremely oxidation resistant product results.

*Example 41*

Two parts of 4,4'-methylenebis(2-tert-butyl-6-tert-amyl-phenol) and 2.5 percent diamyl phosphonate are added with milling to 100 parts of a low density polyethylene prepared by high pressure polymerization and which has an average molecular weight of about 20,000. The resulting product is vastly improved in its oxidative stability.

*Example 42*

To 10,000 parts of a polyethylene having an average molecular weight of about 100,000 and which has a tensile strength of 5400 p.s.i., a Shore D hardness of 70 and a softening temperature of 130° C. under low load is added 10 parts of 4,4'-methylenebis(2,6-di-tert-butyl phenol) and 0.1 percent phosphorus as diisobutyl hydrogen phosphite, to prepare a composition of outstanding oxidative stability.

*Example 43*

To a polyisobutylene polymer having an average molecular weight of 35,000 is added sufficient 4,4'-methylenebis(2-methyl-6-butyl-phenol) to give a composition containing compound and 0.03 percent of the compound and sufficient diisobutyl hydrogen phosphite to give 0.08 percent phosphorous. The composition has improved antioxidant properties due to the presence of 4,4'-methylenebis[2-tert-butyl-6-(1,1,2,2-tetramethylpropyl)phenol].

*Example 44*

To 1,000 parts of a solid polypropylene polymer having a density of 0.905 and a Rockwell hardness greater than 85 and which is isotactic, is added and blended to 5 parts of 4,4'-methylenebis(2,6-di-tert-butylphenol) and 10 parts of diisopropyl hydrogen phosphite.

*Example 45*

To an isotactic polypropylene having a tensile strength greater than 4300 p.s.i. and a compressive strength of about 9,000 p.s.i. is added sufficient 4,4'-methylenebis(2-isopropyl-6-tert-butylphenol) to give a composition containing 0.1 percent of the compound and sufficient dihexyl hydrogen phosphite to give 0.2 percent phosphorus.

*Example 46*

To a wax-like polypropylene having a melting point above 130° C. and a molecular weight of about 4,000, a density of 0.913 is added 0.2 percent of 4,4'-methylenebis(2,6-diisopropylphenol) and 0.25 percent phosphorus as dimethyl hydrogen phosphite. The antioxidant mixture is added to the polypropylene in the molten state and the resulting mixture is allowed to solidify into the desired shape. A polypropylene product of outstanding oxidative stability results.

In addition to the addtive of this invention, saturated hydrocarbon polymers may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Other hydrocarbon polymers which are stabilized against oxidative deterioration according to this invention include natural rubber, GR–S and GR–N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general elastomeric hydrocarbon polymers which are normally susceptible to oxidative deterioration. Such polymers are well known in the art and besides being susceptible of oxidative deterioration are characterized by having molecular weights above about 10,000. The problem resulting from heat, light and catalyst promoted oxidative deterioration in such hydrocarbon polymers is intensified because of free radical formation within the polymers. This leads to various forms of physical and chemical degradation such as chain scissions, autocatalytic oxidation, reduction in molecular weight and loss of original physical properties. The net result is that the desirable useful and necessary properties of the polymers which are associated with their original chemical structure and molecular weights are lost to a greater or lesser extent unless the polymers are stabilized against such deterioration.

Typical stabilized hydrocarbon polymers of this invention are illustrated by the following specific examples wherein all parts and percentages are by weight.

Example 47

To a synthetic rubber master batch comprising 100 parts of GR–S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of 4,4'-methylenebis[2-isopropyl-6-(1,1,3,3-tetramethylbutyl)phenol] and 2.1 parts of diisobutyl hydrogen phosphite. This batch is then cured for 60 minutes at 45 pounds per square inch of steam pressure.

Example 48

One percent of 4,4'-methylenebis(2,6-di-tert-butylphenol) and 2 percent diethyl hydrogen phosphite are added to a synthetic rubber master batch comprising 100 parts of GR–S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 47.

Example 49

Two parts of 4,4'-methylenebis[2-methyl-6-(1,1,3,3-tetramethylbutyl)phenol] and 3 parts of diphenyl hydrogen phosphite are incorporated in 100 parts of raw butyl rubber prepared by the copolymerization of 90 percent of isobutylene and 10 percent of isoprene and having an average molecular weight of 100,000.

Example 50

To 200 parts of raw butyl rubber having an average molecular weight of 600,000 and prepared by copolymerizing 95 percent of isobutylene and 5 percent of butadiene is added 1.5 parts of 4,4'-methylenebis[2-ethyl-6-(2-octyl)phenol] and 1.5 parts of dimethyl hydrogen phosphite.

Example 51

To a master batch of GR–N synthetic rubber comprising 100 parts of GR–N rubber having an average molecular weight of 75,000, 5 parts of zinc stearate, 50 parts of carbon black, 5 parts of road tar, 2 parts of sulfur and 2 parts of mercaptobenzothiazole is added 4 percent based on the weight of the batch of 4,4'-methylenebis(2-methyl-6-tert-butylphenol) and 4 percent diisobutyl hydrogen phosphite.

Example 52

A dry blend of polystyrene 4,4'-methylenebis(2-tert-butyl-6-tert-amylphenol), and tri ethyl phosphite is prepared by mixing 1 part of the phenol and 3 parts of the phosphite with 100 parts of polystyrene having an average molecular weight of 50,000.

Example 53

0.25 percent by weight of 4,4'-methylenebis(2,6-di-tert-butylphenol) and 0.35 percent di tolyl hydrogen phosphite are incorporated in polybutadiene having an average molecular weight of 50,000.

Example 54

To natural rubber (Hevea) is added 0.02 percent of 4,4'-methylenebis(2,6-diisopropylphenol) and 0.03 percent phosphorus or trimethyl phosphite.

The above examples illustrate the improved compositions of this invention. Other such compositions and the methods of preparing the same will now be apparent to one skilled in the art.

As noted above the stabilizers of this invention are also excellent additives to tetraalkyllead antiknock compositions. The tetraalkyllead antiknock agents which are stabilized according to this invention are represented by such compounds as tetramethyllead, tetraethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the antiknock compositions of this invention are organic halide compounds which react with the lead during combustion in the engine to form volatile lead halide. The halogen of these scavengers has an atomic weight between 35 and 80, that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, $\beta,\beta'$-dibromodiisopropyl ether, $\beta,\beta'$-dichlorodiethyl ether, tri chlorobenzene, dibromotoluenes, and in general those disclosed in U.S. Patents 1,593,954; 1,668,022; 2,364,921; 2,479,900; 2,479,901; 2,479,902; 2,479,903; and 2,496,983. In short, we prefer to employ scavengers containing only elements selected from the group consisting of carbon, hydrogen, bromine, chlorine and oxygen. The amount of scavenger used is from about 0.5 to about 2.0 theories, a theory being defined as the quantity required to react with the lead to form lead halide—i.e., 2 atoms of halogen per atom of lead. When we use mixtures of bromine-containing and chlorine-containing scavengers, particularly bromo and chlorohydrocarbons, we can employ concentrations and proportions as described in U.S. Patent 2,398,281. Such concentrations are sufficient to control the amount of deposits formed in the engine.

The tetraalkyllead antiknock compositions of this invention may contain other ingredients such as dyes for identification purposes, metal deactivators, diluents and the like.

Antiknock compositions containing tetraalkyllead antiknock agents are employed by adding them to gasoline to improve the antiknock quality thereof. Such gasolines both before and after addition of the antiknock fluid are benefited by the practice of this invention. Thus gasolines to which have been added a compound of this invention are found to be more stable upon prolonged periods of storage.

The following examples illustrate gasoline embodiments of this invention.

Example 55

To 10,000 parts of a grade 115/145 aviation gasoline containing 4.5 ml. of tetraethyllead per gallon which has an initial boiling point of 110° F. and a final boiling point of 330° F. and an API gravity of 71.0° is added .5 percent of 4,4'-methylenebis(2,6 - di - tert-butylphenol) and 1.0 percent di-n-butyl hydrogen phosphite.

Example 56

To a gasoline containing 26.6 percent aromatics, 20.8 percent olefins and 52.6 percent saturates and which has an API gravity of 62.1° is added 0.1 percent of 4,4'-methylenebis(2-methyl-6-sec-amyl phenol) and 0.2 percent of triamyl phosphite.

Similarly, other compounds of this invention may be added with benefit to gasoline of whatever nature and however processed.

As noted above, the compounds of this invention are also extremely useful in inhibiting and stabilizing non-petroleum fats and oils normally subject to the deteriorating effect of oxidative rancidity. In particular, mixtures of this invention are excellent stabilizers for animal fats and oils, especially lard, against the effects of rancidity.

In formulating the stabilized non-petroleum fats and oils of this invention, the combination of additives is incorporated by appropriate means into the substrate to be stabilized. Thus, in the case of animal, vegetable and fish oils, the additives or combination of additives is added in appropriate quantity and the resulting mixture agitated to insure homogeneity. Where the substrate is a solid at room temperatures—e.g. fats, butter, etc.—the mixing is preferably carried out at temperatures above the melting point of the substrate. The compounds can be mixed with the substrate as a pre-formed mixture or can be separately blended therewith in either order. Generally speaking, it is desirable to first dissolve the additives or additive combination in high concentration in a small portion of the material to be stabilized. The resulting concentration solution is then blended with the remaining bulk. Another way of facilitating the formulation of the composition of this invention is to pre-dissolve the additive or combination of additives in a suitable solvent, such as ethanol, glycerol, propylene glycol, etc. and then mix the resultant solution with the material to be stabilized. However, the preferred way of formulating the compositions of this invention is to pre-dissolve the additive or additive mixture in a fatty acid partial ester of a polyhydroxy compound, notably a monoglyceride, and then blend this mixture with the material to be stabilized. The nature of these monoglyceride compositions is well known in the art and may be made from either animal or vegetable fats, with or without previous hydrogenation. These compositions generally contain about 40 percent of the monostearyl, monooleayl, and/or monopalmityl glycerides or mixtures thereof with the balance comprising a mixture of di- and tri-glycerides. Molecularly distilled monoglycerides may also be used for this purpose. These compositions will be apparent from the following examples.

*Example 57*

With 1000 parts of melted lard is mixed 1 part (0.1 percent) of 4,4'-methylenebis(2-methyl-6-tert-butylphenol) and 1.2 parts of dimethyl hydrogen phosphite. After cooling the lard can be stored for long periods of time without the development of rancidity.

*Example 58*

With 5000 parts of cottonseed shortening is blended 0.5 part (0.01 percent) of 4,4'-methylenebis(2-isopropyl-6-tert-butylphenol) and 0.02 percent of triisobutyl phosphite. The resulting shortening has improved resistance against oxidative rancidity.

*Example 59*

In 2.5 parts of propylene glycol is dissolved with stirring 1 part of 4,4'-methylenebis(2,6-di-tert-amylphenol) and two parts of di-n-butyl hydrogen phosphite. The resulting mixture is then added with stirring to 10,000 parts of cod liver oil. The resultant oil possesses increased resistance against oxidative deterioration.

*Example 60*

To 10,000 parts of corn oil are added with stirring 5 parts (0.05 percent) of 4,4'-methylenebis(2-methyl-6-tert-butylphenol) and 2 parts (0.02 percent) of dimethyl hydrogen phosphite. The resulting corn oil has improved storage stability characteristics.

*Example 61*

To 100 parts of monoglyceride (prepared from a partially hydrogenated vegetable oil) heated to 180° F. is added with stirring 5 parts of 4,4'-methylenebis(2,6-di-tert-butylphenol) and 4 parts of diisobutyl hydrogen phosphite. Ten parts of the resultant monoglyceride formulation are added with stirring to 10,000 parts of melted prime steam lard. The lard composition so formed can be stored at room temperature for long periods of time without developing rancidity.

Those skilled in the art will now clearly understand the various methods of preparing the improved compositions of this invention.

Preparation of the phosphonation used in this invention, such as dibutyl phosphonate, di-(2-4-dichlorocyclohexyl) phosphonate, di-(3-chloro-4-methylphenyl) phosphonate, etc., follows the general procedures described in Ind. and Eng. Chem., 49, 1871 (1957). General methods of making neutral phosphites used in this invention such as triisopropyl phosphite, triamyl phosphite, tridodecyl phosphite, propyl amyl heptyl phosphite, tri-(3-chlorobenzyl) phosphite, trinaphthyl phosphite, dibutyl phenyl phosphite, etc. are described in Kosolapoff "Organophosphorus Compounds." To prepare the bisphenols the procedures described in U.S. Patent 2,807,653 are advantageously used.

*Example 62*

Sufficient 4,4'-methylenebis(2,6-di-tert-butylphenol) and bis(2-ethylhexyl) hydrogen phosphite are blended together to give a composition containing 0.005 part of the phenol per part of phosphite.

*Example 63*

4,4'-methylenebis(2-methyl-6-tert-butylphenol) and dimethyl hydrogen phosphite are compounded into a mixture containing 1000 parts of the phenol per part of phosphite.

*Example 64*

A mixture containing 2.0 parts of 4,4'-methylenebis(2-6-diisopropylphenol) per part of phosphite is prepared by mixing appropriate quantities of 4,4'-methylenebis(2-isopropyl-6-tert-butylphenol) and di-sec-butyl hydrogen phosphite.

The synergistic antioxidant mixtures of this invention may be pre-mixed prior to addition to the material to be protected. Thus, an embodiment of this invention is a mixture containing from 0.005 to 1000 parts of phenolic compound per part of phosphite.

*Example 65*

4,4'-methylenebis(2-methyl-6-tert-octylphenol) and diamyl phosphonate are mixed in such proportion that the resulting mixture has 4 parts of the phenol per part of phosphite.

This application is a continuation-in-part of application Serial No. 718,119, filed February 28, 1958, entitled "Stabilized Lubricants," now abandoned.

We claim:

1. Organic material normally susceptible to oxidative deterioration containing a small antioxidant quantity of a synergistic mixture consisting essentially of from about 0.025 to about 4 percent by weight based on the material to be protected of a phosphite ester having the formula

wherein $R_1$ and $R_2$ are selected from the group consisting of alkyl of from 1–10 carbon atoms, alkoxyalkyl wherein the alkyl has from 1–2 carbon atoms and the alkoxy has from 2–4 carbon atoms, haloalkyl of from 1–10 carbon atoms, cycloalkyl of from 5–8 carbon atoms, halocycloalkyl of from 5–8 carbon atoms, aralkyl of from 7–8 carbon atoms, halophenyl, alkaryl of from 7–14 carbon atoms and haloalkaryl of from 7–14 carbon atoms groups and $R_3$ is hydrogen; and from about 0.01 to about 5 percent by weight based on the material to be protected of a methylene bis-phenol having the formula

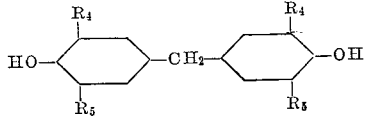

wherein $R_4$ is an alkyl group which contains from 3 to 12 carbon atoms and is branched on its alpha carbon atom and $R_5$ is an alkyl group containing from 1 to 12 carbon atoms.

2. Lubricating oil normally susceptible to oxidative deterioration containing a small antioxidant quantity of a syergistic mixture consisting essentially of from about 0.025 to about 4 percent by weight based on the oil of an oil soluble phosphite ester having the formula

wherein $R_1$ and $R_2$ are selected from the group consisting of alkyl of from 1–10 carbon atoms, alkoxyalkyl wherein the alkyl has from 1–2 carbon atoms and the alkoxy has from 2–4 carbon atoms, haloalkyl of from 1–10 carbon atoms, cycloalkyl of from 5–8 carbon atoms, aralkyl of from 7–8 carbon atoms, halo phenyl, alkaryl of from 7–14 carbon atoms and haloalkaryl of from 7–14 carbon atoms groups and $R_3$ is hydrogen; and from about 0.01 to about 5 percent by weight based on the oil of a methylene bis-phenol having the formula

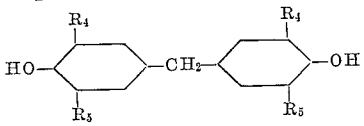

wherein $R_4$ is an alkyl group which contains from 3 to 12 carbon atoms and is branched on its alpha carbon atom and $R_5$ is an alkyl group containing from 1 to 12 carbon atoms.

3. The composition of claim 2 further characterized in that said ester and said phenol are present in proportions such that there are from about 0.5 to about 5 moles of said ester per mole of said phenol.

4. The composition of claim 2 wherein said ester is a dialkyl hydrogen phosphite in which each alkyl group contains up to 10 carbon atoms.

5. A lubricating oil selected from the group consisting of petroleum hydrocarbon oils and synthetic disester oils normally susceptible to oxidative deterioration containing a small antioxidant quantity of a synergistic mixture consisting essentially of from about 0.025 to about 4 percent by weight based on the oil of a dialkyl hydrogen phosphite in which each alkyl group contains from 1 to 8 carbon atoms and from about 0.1 to about 3 percent by weight based on the oil of a methylene bis-phenol selected from the group consisting of 4,4'-methylenebis(2,6-diisopropyl phenol) and 4,4'-methylenebis-(6-tert-butyl-o-cresol).

6. A lubricating oil selected from the group consisting of petroleum hydrocarbon oils and synthetic diester oils normally susceptible to oxidative deterioration containing a small antioxidant quantity of a synergistic mixture phosphite in which each alkyl group contains from 4 to percent by weight based on the oil of a dialkyl hydrogen phosphite in which each alkyl group contains from 4 to 10 carbon atoms and from about 0.1 to about 3 percent by weight based on the oil of 4,4'-methylenebis(2,6-di-tert-butyl phenol).

7. The composition of claim 1 where said organic material is a solid saturated hydrocarbon polymer prepared by polymerization of a mono-olefinic hydrocarbon having from 2 to 5 carbon atoms.

8. The composition of claim 1 where said organic material is a rubbery, conjugated diolefin polymer.

9. A synergistic antioxidant mixture for addition to organic material, consisting essential of a phosphite ester having the formula

wherein $R_1$ and $R_2$ are selected from the group consisting of alkyl of from 1–10 carbon atoms, alkoxyalkyl wherein the alkyl has from 1–2 carbon atoms and the alkoxy has from 2–4 carbon atoms, haloalkyl of from 1–10 carbon atoms, cycloalkyl of from 5–8 carbon atoms, halocycloalkyl of from 5–8 carbon atoms, aralkyl of from 7–8 carbon atoms, halo phenyl, alkaryl of from 7–14 carbon atoms and haloalkaryl of from 7–14 carbon atoms groups and $R_3$ is hydrogen; and a methylene bis-phenol having the formula

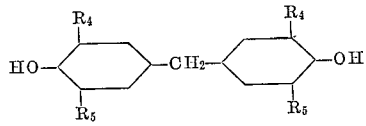

wherein $R_4$ is an alkyl group which contains from 3 to 12 carbon atoms and is branched on its alpha carbon atom and $R_5$ is a alkyl group containing from 1 to 12 carbon atoms in amount such that there is from 0.005 to 1000 parts of said phenol per part of phosphite.

10. The composition of claim 5 wherein said lubricating oil is a petroleum hydrocarbon oil.

11. The composition of claim 10 wherein said methylene bisphenol is 4,4'-methylenebis(2,6-diisopropyl-phenol).

12. The composition of claim 10 wherein said methylene bisphenol is 4,4'-methylenebis(6-tert-butyl-o-cresol).

13. The composition of claim 6 wherein said lubricating oil is a petroleum hydrocarbon oil.

14. The composition of claim 5 wherein said lubricating oil is a synthetic diester oil.

15. The composition of claim 6 wherein said lubricating oil is a synthetic diester oil.

16. Functional fluid normally susceptible to oxidative deterioration containing a small antioxidant quantity of the synergistic antioxidant mixture of claim 9.

17. Rubber normally susceptible to oxidative deterioration containing a small antioxidant quantity of the synergistic antioxidant mixture of claim 9.

18. Gasoline normally susceptible to oxidative deterioration containing a small antioxidant quantity of the synergistic antioxidant mixture of claim 9.

19. Non-petroleum fats and oils normally susceptible to oxidative deterioration containing a small antioxidant quantity of the synergistic antioxidant mixture of claim 9.

20. A lubricating oil selected from the group consisting of petroleum hydrocarbon oils and synthetic diester oils normally susceptible to oxidative deterioration containing a small antioxidant quantity of a synergistic mixture consisting of from about 0.025 to about 4 percent by weight, based on the oil, of a dialkyl hydrogen phosphite selected from the group consisting of dimethyl hydrogen phosphite, di-sec-butyl hydrogen phosphite, di-(1,3-dimethylbutyl) hydrogen phosphite and dioctyl hydrogen phosphite and from about 0.1 to about 3 percent by weight, based on the oil, of a methylenebis phenol having the formula:

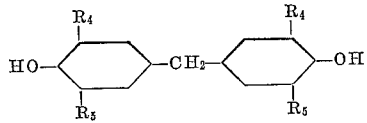

wherein $R_4$ is an alkyl group which contains from 3 to 12 carbon atoms and is branched on its alpha carbon atom and $R_5$ is an alkyl group containing from 1 to 12 carbon atoms.

21. Petroleum hydrocarbon oil normally susceptible to oxidative deterioration containing a small antioxidant quantity of a synergistic mixture consisting of from about 0.025 to about 4 percent by weight, based on the oil, of a dialkyl hydrogen phosphite selected from the group consisting of dimethyl hydrogen phosphite, di-sec-butyl hydrogen phosphite, di(1,3-dimethylbutyl)hydrogen phosphite and dioctyl hydrogen phosphite and from about 0.1 to about 3 percent by weight, based on the oil, of a methylenebis phenol having the formula

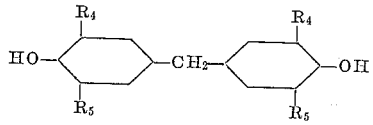

wherein $R_4$ is an alkyl group which contains from 3 to 12 carbon atoms and is branched on its alpha carbon atom and $R_5$ is an alkyl group containing from 1 to 12 carbon atoms.

22. The hydrocarbon petroleum oil of claim 21 wherein said dialkyl hydrogen phosphite is dimethyl hydrogen phosphite.

23. The hydrocarbon petroleum oil of claim 21 wherein said dialkyl hydrogen phosphite is di-sec-butyl hydrogen phosphite.

24. The hydrocarbon petroleum oil of claim 21 wherein said dialkyl hydrogen phosphite is di(1,3-dimethylbutyl) hydrogen phosphite.

25. The hydrocarbon petroleum oil of claim 21 wherein said dialkyl hydrocarbon phosphite is dioctyl hydrogen phosphite.

26. A lubricating oil selected from the group consisting of petroleum hydrocarbon oils and synthetic diester oils normally susceptible to oxidative deterioration containing a small antioxidant quantity of a synergistic mixture consisting of from about 0.025 to about 4 percent by weight, based on the oil, of a dialkyl hydrogen phosphite selected from the group consisting of dimethyl hydrogen phosphite, di-sec-butyl hydrogen phospite, di(1,3-dimethylbutyl) hydrogen phosphite and dioctyl hydrogen phosphite and from about 0.1 to about 3 percent by weight, based on the oil, of a methylenebis phenol selected from the group consisting of 4,4'-methylenebis(2,6-diisopropylphenol), 4,4'-methylenebis(6-tert-butyl-o-cresol) and 4,4'-methylenebis(2,6-di-tert-butylphenol).

27. Petroleum hydrocarbon oil normally susceptible to oxidative deterioration containing a small antioxidant quantity of a synergistic mixture consisting of from about 0.025 to about 4 percent by weight, based on the oil, of a dialkyl hydrogen phosphite selected from the group consisting of dimethyl hydrogen phosphite, di-sec-butyl hydrogen phosphite, di(1,3-dimethylbutyl) hydrogen phosphite and dioctyl hydrogen phosphite and from about 0.1 to about 3 percent by weight, based on the oil, of a methylenebis phenol selected from the group consisting of 4,4'-methylenebis(2,6-diisopropylphenol), 4,4'-methylenebis(6-tert-butyl-o-cresol) and 4,4'-methylenebis(2,6-di-tert-butylphenol).

References Cited in the file of this patent

UNITED STATES PATENTS

| | | |
|---|---|---|
| 2,220,851 | Schrieber | Nov. 5, 1940 |
| 2,226,543 | Ashburn et al. | Dec. 31, 1940 |
| 2,432,095 | Frey | Dec. 9, 1947 |
| 2,612,488 | Nelson | Sept. 30, 1952 |
| 2,726,226 | Werkheiser | Dec. 6, 1955 |
| 2,807,653 | Fibey et al. | Sept. 24, 1957 |
| 2,944,086 | Coffield et al. | July 5, 1960 |
| 2,951,052 | Darby | Aug. 30, 1960 |
| 2,985,617 | Sayler et al. | May 23, 1961 |

UNITED STATES PATENT OFFICE
CERTIFICATE OF CORRECTION

Patent No. 3,115,465 December 24, 1963

Harold D. Orloff et al.

It is hereby certified that error appears in the above numbered patent requiring correction and that the said Letters Patent should read as corrected below.

Column 1, line 65, for "preferably 0.25 to 2-percent by weight based on the oil" read -- weight based on the material to be protected of an oil --; column 7, line 2, for "additive-test" read -- additive-free --; column 13, lines 15 and 62, for "axelaic", each occurrence, read -- azelaic --; column 22, line 36, for "1,593,954" read -- 1,592,954 --; column 25, line 68, after "mixture" insert -- consisting essentially of from about 0.025 to about 4 percent by weight based on the oil of a dialkyl hydrogen --; same column 25, lines 70 and 71, strike out "percent by weight based on the oil of a dialkyl hydrogen phosphite in which each alkyl group contains from 4 to".

Signed and sealed this 4th day of August 1964.

(SEAL)
Attest:

ERNEST W. SWIDER
Attesting Officer

EDWARD J. BRENNER
Commissioner of Patents